US012501144B2

(12) United States Patent
Liang

(10) Patent No.: US 12,501,144 B2
(45) Date of Patent: Dec. 16, 2025

(54) DISPLAY CONTROL METHOD, ELECTRONIC DEVICE AND MEDIUM

(71) Applicant: VIVO MOBILE COMMUNICATION CO., LTD., Guangdong (CN)

(72) Inventor: Youwen Liang, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 166 days.

(21) Appl. No.: 18/231,385

(22) Filed: Aug. 8, 2023

(65) Prior Publication Data

US 2023/0412914 A1 Dec. 21, 2023

Related U.S. Application Data

(63) Continuation of application No. PCT/CN2022/075376, filed on Feb. 7, 2022.

(30) Foreign Application Priority Data

Feb. 9, 2021 (CN) .......................... 202110180354.9

(51) Int. Cl.
*H04N 23/63* (2023.01)

(52) U.S. Cl.
CPC ......... *H04N 23/632* (2023.01); *H04N 23/635* (2023.01)

(58) Field of Classification Search
CPC .... H04N 23/632; H04N 23/635; H04N 23/61; H04N 23/633; H04N 23/631; G06F 3/04845; G06F 3/0486
See application file for complete search history.

(56) References Cited

U.S. PATENT DOCUMENTS

| 2014/0368462 | A1  | 12/2014 | Shepelev |
| 2016/0357406 | A1  | 12/2016 | Lee et al. |
| 2018/0024705 | A1* | 1/2018  | Silano ................... G06F 3/0482 715/720 |
| 2020/0053293 | A1* | 2/2020  | Lee ........................ H04N 23/64 |
| 2020/0409539 | A1  | 12/2020 | Nakanishi et al. |
| 2022/0286622 | A1  | 9/2022  | Zhou |

FOREIGN PATENT DOCUMENTS

| CN | 104349065  | A  | 2/2015  |
| CN | 106937055  | A  | 7/2017  |
| CN | 108924418  | A  | 11/2018 |
| CN | 110944113  | A  | 3/2020  |
| CN | 111240483  | A  | 6/2020  |
| CN | 111752450  | A  | 10/2020 |
| CN | 112995506  | A  | 6/2021  |
| JP | 2005136632 | A  | 5/2005  |
| JP | 2016521418 | A  | 7/2016  |
| WO | 2018169273 | A1 | 9/2018  |

\* cited by examiner

*Primary Examiner* — Yogesh K Aggarwal
(74) *Attorney, Agent, or Firm* — The Webb Law Firm

(57) ABSTRACT

A display control method includes receiving a first input performed by a user on a first object sign in an object display control region on a shooting preview screen; and updating a display mode of a first object in a first preview image displayed on the shooting preview screen, in response to the first input; where the object display control region includes at least one object sign, each object sign is used to indicate a shooting object in the first preview image, and a shooting object indicated by the first object sign is the first object.

20 Claims, 13 Drawing Sheets

US 12,501,144 B2

DISPLAY CONTROL METHOD, ELECTRONIC DEVICE AND MEDIUM

CROSS-REFERENCE TO RELATED APPLICATIONS

This application is a Bypass Continuation Application of International Patent Application No. PCT/CN2022/075376 filed Feb. 7, 2022, and claims priority to Chinese Patent Application No. 202110180354.9 filed Feb. 9, 2021, the disclosures of which are hereby incorporated by reference in their entireties.

BACKGROUND OF THE INVENTION

Field of the Invention

This application belongs to the field of display technologies, and specifically relates to a display control method, an electronic device, and a medium.

Description of Related Art

With the popularity of smart phones and the increasingly powerful shooting capabilities of the phones, using mobile phones to take photos has become a part of our everyday life. Currently, users take photos with the assistance of preview images provided by the phone. The preview image displayed on the phone represents the actual scene captured by the sensor device.

During the process of displaying preview images, if the user needs to adjust the display of the preview image, the adjustment window is first called up on the shooting preview screen through user operations. Then, operations are performed within the adjustment window to achieve display adjustment. However, this process can easily lead to lower efficiency in adjusting the display.

SUMMARY OF THE INVENTION

According to a first aspect, an embodiment of this application provides a display control method, where the method includes:
  receiving a first input performed by a user on a first object sign in an object display control region on a shooting preview screen; and
  updating a display mode of a first object in a first preview image displayed on the shooting preview screen, in response to the first input;
  where the object display control region includes at least one object sign, each object sign is used to indicate a shooting object in the first preview image, and a shooting object indicated by the first object sign is the first object.

According to a second aspect, an embodiment of this application provides a display control apparatus, where the apparatus includes:
  a first receiving module configured to receive a first input performed by a user on a first object sign in an object display control region on a shooting preview screen; and
  a first updating module configured to update a display mode of a first object in a first preview image displayed on the shooting preview screen, in response to the first input;
  where the object display control region includes at least one object sign, each object sign is used to indicate a shooting object in the first preview image, and a shooting object indicated by the first object sign is the first object.

According to a third aspect, an embodiment of this application provides an electronic device, where the electronic device includes a processor, a memory, and a program or instructions stored in the memory and executable on the processor, and when the program or instructions are executed by the processor, steps of the method according to the first aspect are implemented.

According to a fourth aspect, an embodiment of this application provides a non-transitory readable storage medium, where the non-transitory readable storage medium stores a program or instructions, and when the program or instructions are executed by a processor, steps of the method according to the first aspect are implemented.

According to a fifth aspect, an embodiment of this application provides a chip, where the chip includes a processor and a communications interface, the communications interface is coupled to the processor, and the processor is configured to run a program or instructions so as to implement the method according to the first aspect.

According to a sixth aspect, an embodiment of this application provides a computer program product, where the computer program product is stored in a non-transient storage medium, and the computer program product is executed by at least one processor so as to implement the method according to the first aspect.

DESCRIPTION OF THE INVENTION

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms "first", "second", and the like in the specification and claims of this application are used to distinguish between similar objects rather than to describe a specific order or sequence. It should be understood that terms used in this way are interchangeable in appropriate circumstances so that the embodiments of this application can be implemented in other orders than the order illustrated or described herein. In addition, "first", "second", and the like are usually used to distinguish objects of a same type and do not limit the quantity of objects. For example, there may be one or a plurality of first objects. In addition, in this specification and claims, "and/or" indicates at least one of the connected objects, and the character "I" generally indicates an "or" relationship between the contextually associated objects. A "plurality" in this application is at least two.

The following describes the display control method provided in the embodiments of this application through specific embodiments and application scenarios thereof with reference to the accompanying drawings.

Figure 1:
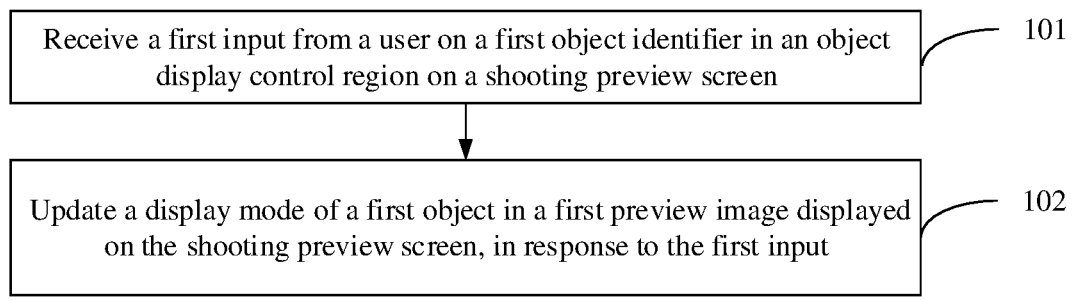
FIG. 1 is a first flowchart of a display control method according to an embodiment of this application.

As shown in FIG. 1, an embodiment of this application provides a display control method that can be applied to electronic devices including but not limited to mobile terminals. The method includes the following steps.

Step 101. Receive a first input performed by a user on a first object sign in an object display control region on a shooting preview screen.

Figure 2:
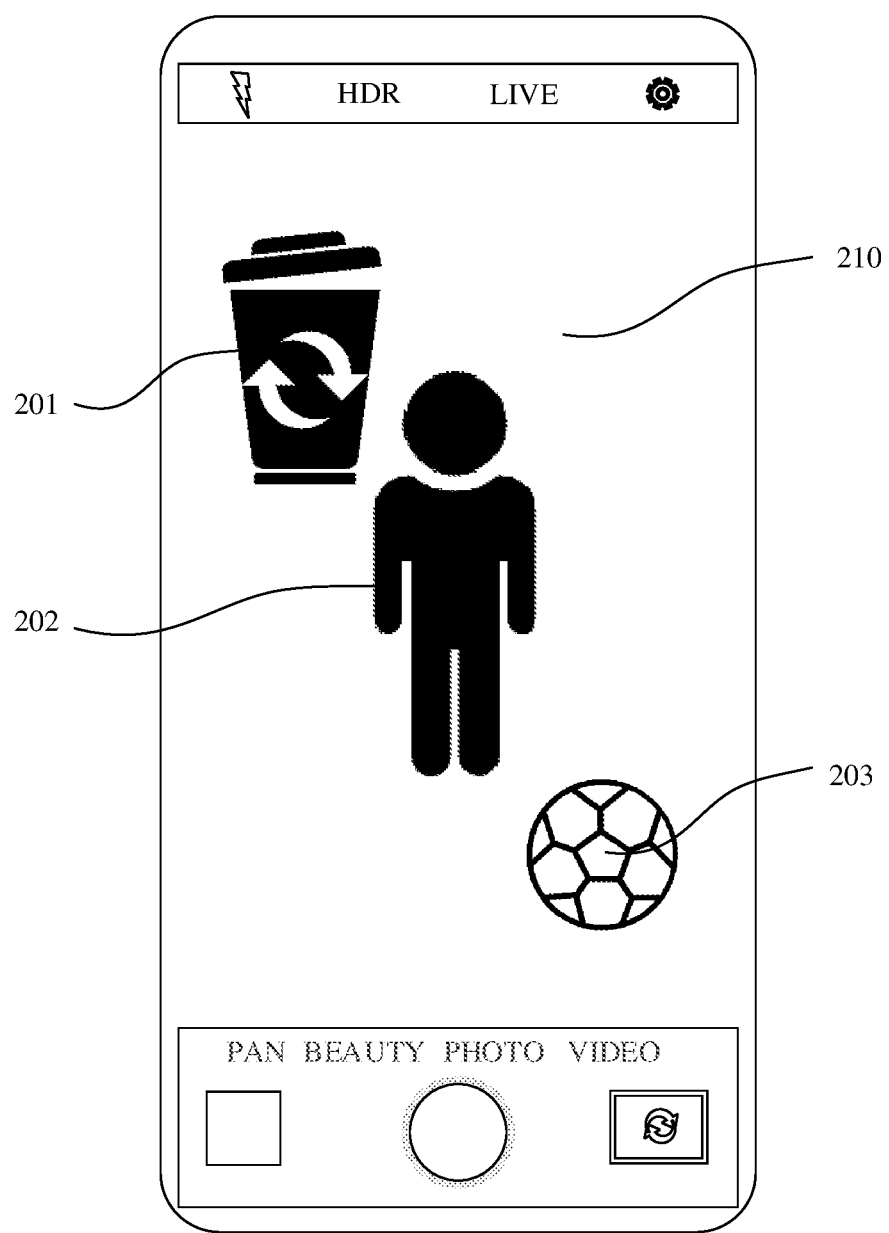
FIG. 2 is a first shooting preview screen according to an embodiment of this application.

The user opens a camera and initiates the preview, displaying the shooting preview screen. As shown in FIG. 2, a first preview image 210 captured by the camera is displayed in the shooting preview screen. By performing target detection on the first preview image, at least one object included in the first preview image can be determined. For example, as shown in FIG. 2, the exemplary first preview image includes at least three objects: a trash bin 201, a person 202, and a football 203. Target detection can be performed on the first preview image to detect the trash bin 201, person 202, and football 203 in the first preview image. In an example, an artificial intelligence (AI) scene detection algorithm can be employed to perform target detection on the first preview image. For example, the target detection algorithm can be used for target detection on the first preview image, and there are various target detection algorithms, which are not limited in this application.

Figure 3:
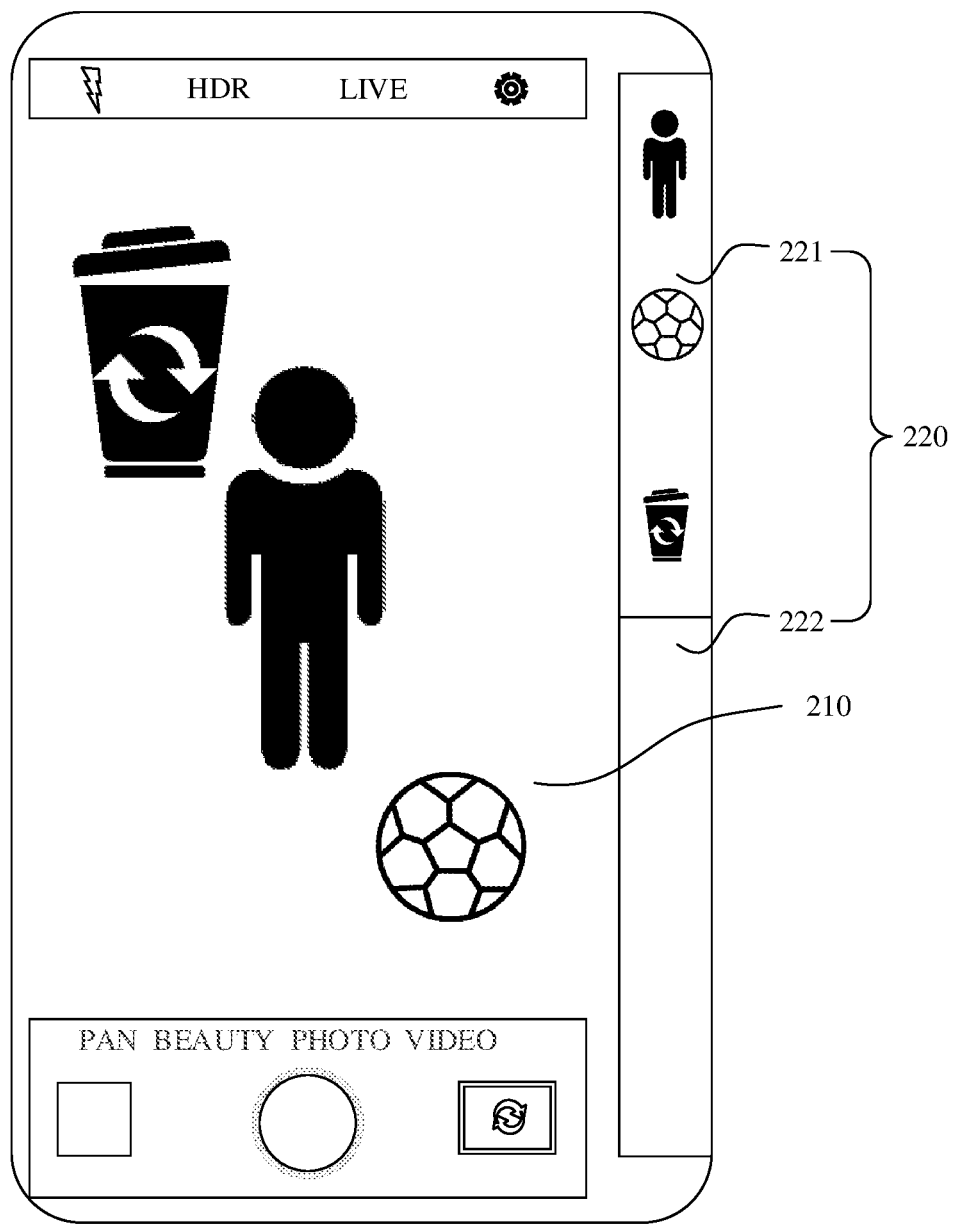
FIG. 3 is a second shooting preview screen according to an embodiment of this application.

As shown in FIG. 3, an object display control region 220 can be superimposed and displayed on the shooting preview screen, with an area smaller than an area of the first preview image 210 displayed. The object display control region may include a sign of at least one object (that is, at least one object sign), and the user can view the sign of the at least one object in the object display control region. Each object sign is used to indicate a shooting object in the first preview image, where a shooting object indicated by the first object sign is the first object. Optionally, the sign of the at least one object may be an image of a reduced image region of the at least one object in the first preview image, or may be a control or text sign corresponding to the at least one object. In an example, the object display control region may be a rectangular display control region or the like.

The user can select a sign of an object whose display mode needs to be updated according to needs. For example, if the user selects the first object sign, the first object corresponding to the first object sign is the selected object whose display mode needs to be updated. For example, if the user selects the trash bin in FIG. 3, the user can perform the first input for the trash bin. In an example, the first input may include a drag and drag input, a tap input, and the like.

Step 102: Update a display mode of a first object in a first preview image displayed on the shooting preview screen, in response to the first input.

Figure 4:
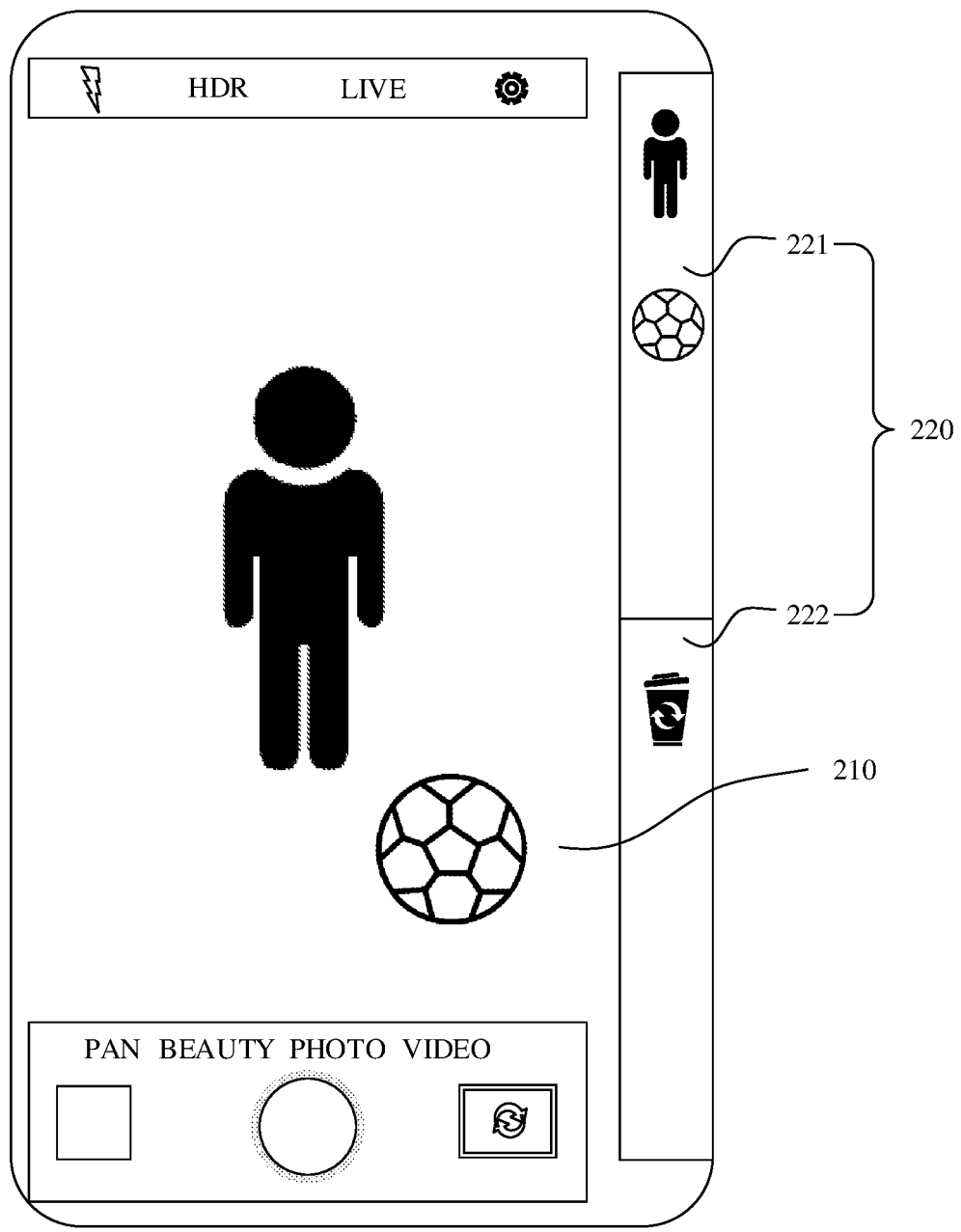
FIG. 4 is a third shooting preview screen according to an embodiment of this application.

After the first input is received, the display mode of the first object in the first preview image can be updated in response to the first input. For example, before the first input is received, the first object is normally displayed in the first preview image, displaying data acquired by the camera, and the display mode of the first object in the first preview image can be updated in response to the first input, for example, updated to a masked mode. Alternatively, before the first input is received, the display mode of the first object in the first preview image is a masked mode, and the display mode of the first object in the first preview image can be updated in response to the first input, for example, updated to a display mode of data collected by the camera. For example, before the first input is received, the trash bin in FIG. 3 is displayed normally, and after the first input is made to the trash bin in FIG. 3, a display mode of the trash bin in the first preview image 210 in FIG. 3 can be updated in response to the first input, for example, as shown in FIG. 4, updated to a masked mode, which masks the trash bin 201 in the first preview image of the shooting preview screen. The masking can include hiding, deleting, covering with a preset image, blurring, and the like.

In the display control method of this embodiment, the object display control region in the shooting preview screen may include at least one object sign, a first input performed by a user on the first object sign can be received, and the display mode of the first object in the first preview image can be updated in response to the first input. In other words, by receiving the first input performed by a user on the first object sign once, the display mode of the first object in the first preview image can be updated, achieving display adjustments. This can improve the efficiency of display adjustments for preview images while improving the flexibility of the display and meeting the user demand for the display of preview images.

In an embodiment, the object display control region includes a first display control sub-region and a second display control sub-region, the first display control sub-region includes at least one object sign of a first display mode, and the second display control sub-region includes at least one object sign of a second display mode; where the first display mode and the second display mode each are one of a displayed mode and a first masked mode;

the updating a display mode of a first object in a first preview image displayed on the shooting preview screen includes: updating the display mode of the first object in the first preview image displayed on the shooting preview screen to the second display mode; and after the receiving a first input performed by a user on a first object sign in an object display control region on a shooting preview screen, the method further includes: canceling the display of the first object sign in the first display control sub-region and displaying the first object sign in the second display control sub-region, in response to the first input.

As shown in FIG. 3, in this embodiment, the object display control region 220 can be divided into the first display control sub-region 221 and the second display control sub-region 222. The first display control sub-region 221 may include at least one object sign of the first display mode, including the first object sign. The display mode of the first object in the first preview image displayed in the shooting preview screen can be updated to the second display mode in response to the first input. It should be noted that the first display mode is different from the second display mode. The second display control sub-region may be used to display an object sign of the second display mode. After the first input performed by a user on the first object sign of the first object is received, the display of the first object sign in the first display control sub-region 221 can be canceled and the first object sign is displayed in the second display control sub-region 222. For example, as shown in FIG. 3, the user performs the first input on the trash bin, and in response to the first input, display of a trash bin sign in the first display control sub-region can be canceled and the trash bin sign is displayed in the second display control sub-region, indicating that the trash bin is being masked. By viewing the first display control sub-region and the second display control sub-region, the user can clearly distinguish between an object being displayed and an object being masked in the first preview image, which is convenient for the user to distinguish between the displayed object and the masked object. In an example, an end position of the first input may be in the second display control sub-region, meaning that by simply dragging the first object sign from the first display control sub-region to the second display control sub-region by the user, the display mode of the first object can be updated, and the first object sign can be moved from the first display control sub-region to the second display control sub-region. This operation is convenient and can improve the efficiency of masking.

In an embodiment, after the canceling the display of the first object sign in the first display control sub-region and displaying the first object sign in the second display control sub-region, in response to the first input, the method further includes:

receiving a second input performed by a user on the first object sign in the second display control sub-region; and in response to the second input, updating the display mode of the first object in the first preview image on the shooting preview screen to the first display mode, canceling the display of the first object sign in the second display control sub-region and displaying the first object sign in the first display control sub-region.

If the user needs to restore the display mode of the first object to the display mode before the update, that is, the user can make a second input on the first object sign in the second display control sub-region after the canceling the display of the first object sign in the first display control sub-region and displaying the first object sign in the second display control sub-region, in response to the first input. As a result, in response to the second input, the display mode of the first object in the first preview image on the shooting preview screen is updated to the first display mode, the display of the first object sign in the second display control sub-region is canceled, and the first object sign is displayed in the first display control sub-region, thereby restoring the display of the first object in the first preview image. For example, if the first display mode is the displayed mode and the second display mode is the first masked mode, after the first object sign is displayed in the second display control sub-region, the second display control sub-region can include at least one object sign of the second display mode, including the first object sign. After the second input is performed on the first object sign in the second display control sub-region by the user, the masking of the first object in the first preview image can be canceled in response to the second input, to be specific, the display mode of the first object before updating the display mode of the first object in the first preview image to the second display mode, namely, the first display mode, is restored, the display of the first object sign in the second display control sub-region is canceled, the display of the first object sign in the first display control sub-region is restored. This improves the flexibility of the display. In an example, the second input may include, but is not limited to, a drag input or a tap input.

In an embodiment, after the updating a display mode of a first object in a first preview image displayed on the shooting preview screen, in response to the first input, the method further includes: updating the first preview image displayed on the shooting preview screen to a second preview image, and in a case that the second preview image includes the first object, updating the display mode of the first object in the second preview image to a target display mode, where the target display mode is a display mode of the first object in the first preview image at a target moment before the first preview image is updated to the second preview image, and the target moment is a moment with a shortest time interval from an update moment of the second preview image.

Figure 5:
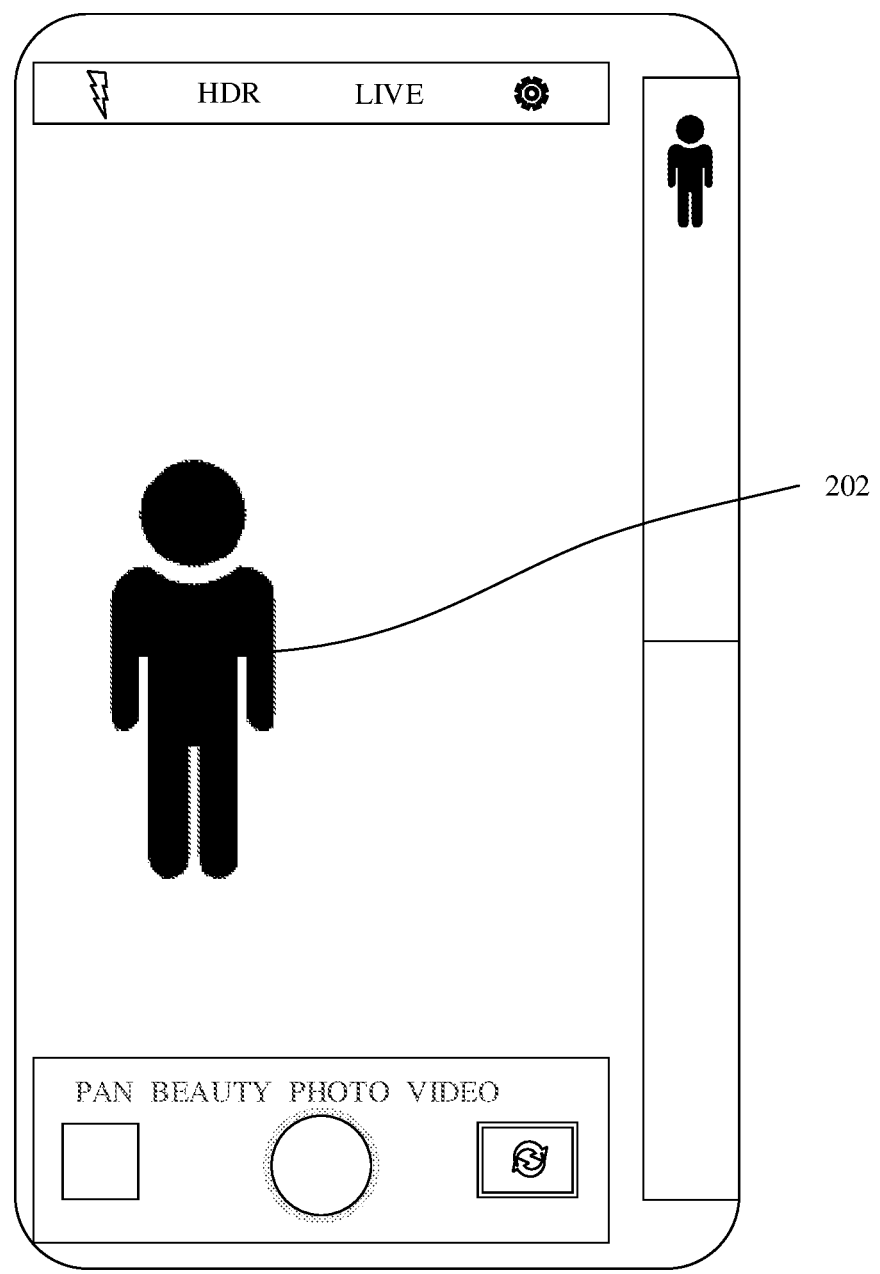
FIG. 5 is a fourth shooting preview screen according to an embodiment of this application.

In the shooting preview process, if the camera is moved or the camera angle is changed, content of a preview image subsequently captured changes accordingly. As a result, the first object detected in the preview image subsequently captured may also change. Consequently, the object sign displayed in the object display control region can be updated to represent a sign of an object determined through target detection on the preview image subsequently captured. For example, if the camera is moved to a different angle and a preview image newly captured does not include the first object such as the trash bin as shown in FIG. 5, but only includes one object, that is, the person 202, only a sign of a detected first object in the preview image is displayed in the first display control sub-region of the object display control region, namely, a sign of the person. Since the preview image newly captured does not include the trash bin, the sign of the trash bin is no longer displayed in the second display control sub-region. If the user continues to change the camera angle and a second preview image subsequently captured is displayed in the shooting preview screen, including at least one object, for example, the trash bin, person, and football, including the first object such as the trash bin, and the display mode of the first object in the second preview image in the shooting preview screen can be updated to the target display mode. For example, the display mode of the trash bin is updated to the target display mode while the display modes of the person 202 and football 203 remain unchanged. The target display mode is a display mode of the first object in the first preview image at a target moment before the first preview image is updated to the second preview image, and the target moment is a moment with a shortest time interval from an update moment of the second preview image. The update moment of the second preview image can be understood as a moment when the first preview image in the shooting preview screen is updated to the second preview image. In other words, the target display mode represents a display mode of the first object in the most recent first preview image before the first preview image is updated to the second preview image. For example, the target display mode may be the first masked mode, in which case the display mode of the first object in the second preview image is updated to the first masked mode. In this embodiment, even if the camera is moved and the preview image is updated, as long as the first object is included in the subsequent preview image, the display mode of the first object in the second preview image can be updated to the target display mode, thereby enhancing the flexibility of display control.

Figure 6:
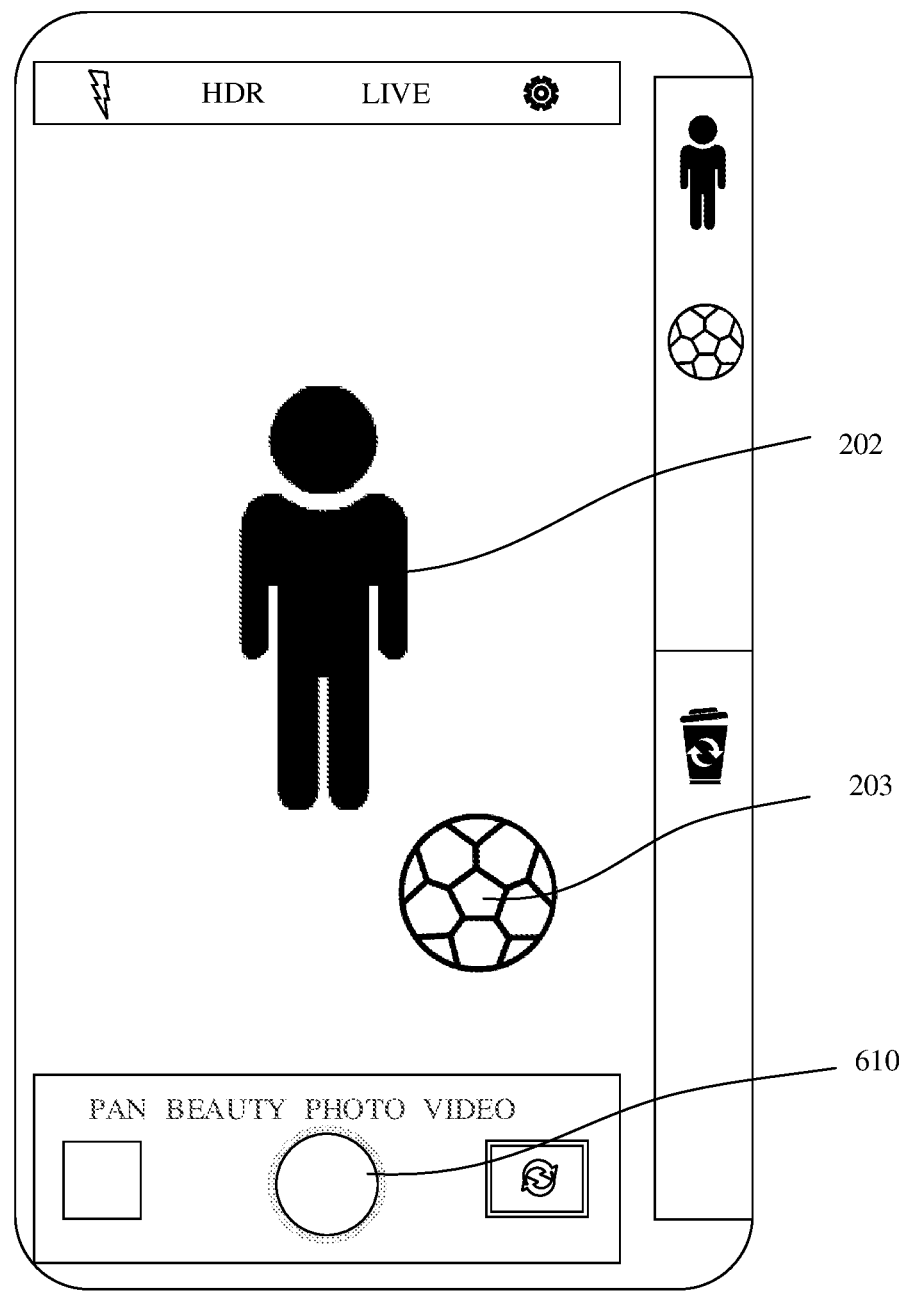
FIG. 6 is a fifth shooting preview screen according to an embodiment of this application.

As shown in FIG. 6, in addition, signs of objects other than the first object detected in the second preview image can be displayed in the first display control sub-region. For example, as shown in FIG. 6, the signs of the person 202 and football 203 can be displayed in the first display control sub-region, while the first object sign, such as the sign of the trash bin, is displayed in the second display control sub-region. The signs in this application refer to text, symbols, images, or other visual elements used to indicate information. They can be displayed using controls or other containers as the medium for presenting information, including but not limited to text signs, symbol signs, image signs, and the like.

In an embodiment, the object display control region includes a third display control sub-region, the third display control sub-region includes at least one object sign of a third display mode, and the third display mode is a second masked mode; and the method further includes:
detecting an object in a preview image displayed on the shooting preview screen; and
in a case that a third preview image displayed on the shooting preview screen includes a second object matching an object to be masked, updating a display mode of the second object in the third preview image to a third display mode and displaying an object sign of the second object in the third display control sub-region.

A target detection algorithm can be used to perform target detection on the preview image displayed in the shooting preview screen. There are multiple target detection algorithms available, which are not limited in this application. In a case that the second object matching the object to be masked is present in the preview image displayed in the shooting preview screen, the display mode of the second object in the preview image can be updated to the third display mode, and the object sign of the second object is then displayed in the third display control sub-region.

To be specific, the object to be masked is preset. It can be understood that the object to be masked is an object that needs to be masked. After detection is performed on the objects in the third preview image, if the second object matching the object to be masked is included in the third preview image the third preview image, it is considered that the third preview image includes the second object that has a higher similarity with the object to be masked, and there is a great possibility that the second object and the object to be masked are of the same object type. Therefore, the display mode of the second object in the third preview image can be updated to the second masked mode, achieving the masking of the second object in the third preview image, and displaying the sign of the second object in the third display control sub-region of the object display control region. This not only meets the display requirements but also improves the flexibility of the display.

Figure 7:
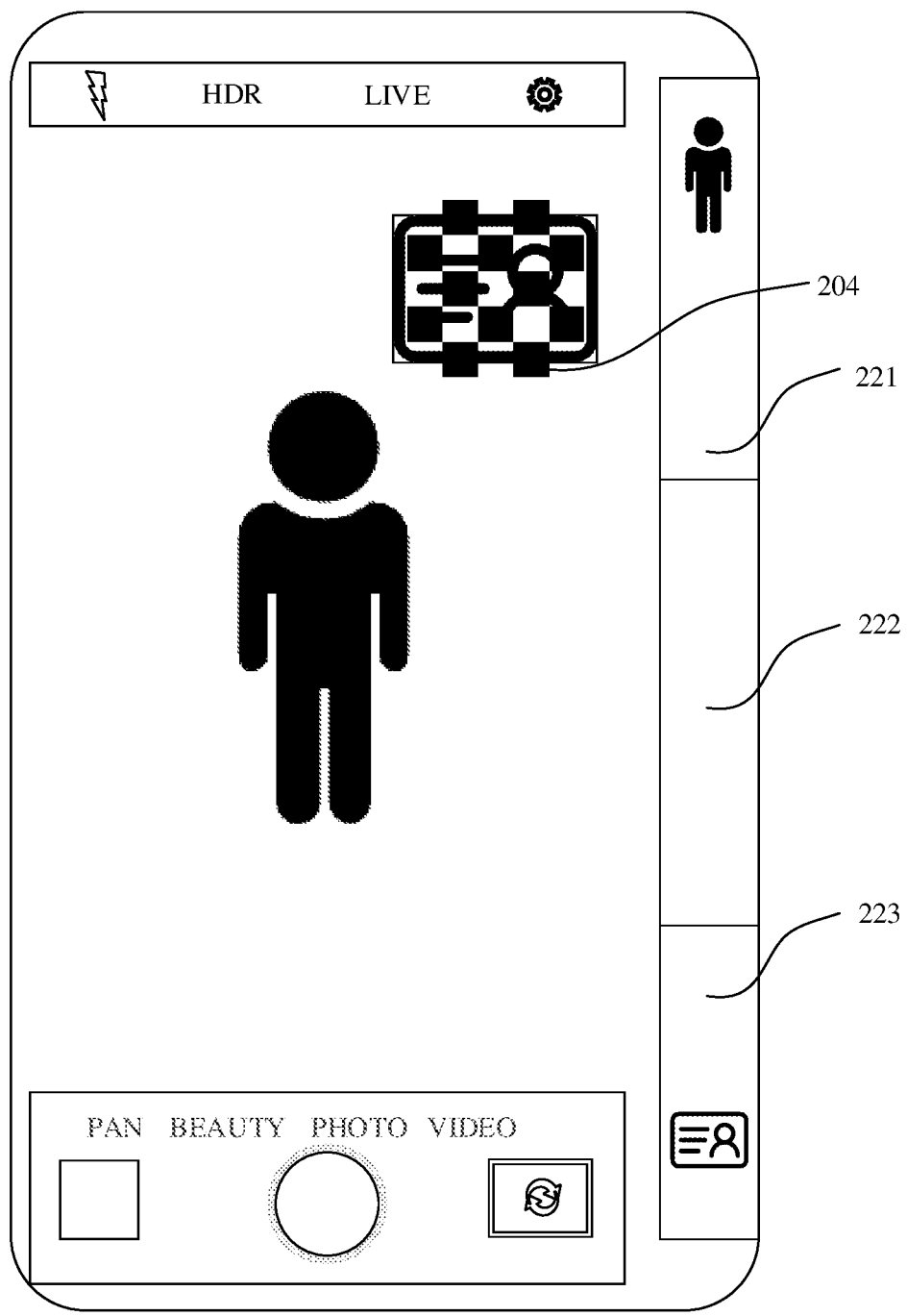
FIG. 7 is a sixth shooting preview screen according to an embodiment of this application.

For example, an identity card object is preset as the object to be masked, to be specific, the object to be masked is the identity card object. After objects are detected in the third preview image, matching can be performed between the identity card object and the objects in the third preview image. If the objects in the third preview image include the second object 204 matching the identity card object, the second object 204 in the third preview image can be masked, as shown in FIG. 7. In addition, the object display control region may include the third display control sub-region 223, and the sign of the second object can be displayed in the third display control sub-region. It should be noted that the third display control sub-region is different from the first display control sub-region and the second display control sub-region. The object display control region can be divided into the first display control sub-region, the second display control sub-region, and the third display control sub-region. The first display control sub-region displays object signs of the first display mode, the second display control sub-region displays object signs of the second display mode, and the third display control sub-region displays object signs of the third display mode, as shown in FIG. 7.

It should be noted that the first masked mode may be a temporarily masked mode. For example, if the first object is currently displayed normally, it is in the displayed mode. With the first input on the first object sign by the user, the display mode of the first object can be updated to the first masked mode, and subsequently, with the second input on the first object sign by the user, the display mode of the first object can be restored from the first masked mode to the displayed mode. This allows for temporary masking of the first object, and restoration can be easily performed through a user operation. The second masked mode is different from the first masked mode, and the second masked mode may be a long-term masked mode. For example, in a case that the preview image captured by the camera includes the second object matching the object to be masked, the display mode of the second object can be updated to the second masked mode without the need for any input on the second object sign by a user. That is, once the second object matching the object to be masked is detected in the preview image, updating to the second masked mode is performed.

In an embodiment, before the updating a display mode of the second object in the third preview image to a third display mode and displaying an object sign of the second object in the third display control sub-region, the method further includes: capturing a fourth preview image through a camera and displaying the fourth preview image on the shooting preview screen; receiving a third input from a user on a third object in the fourth preview image; and marking the third object as an object to be masked in response to the third input.

Figure 8:
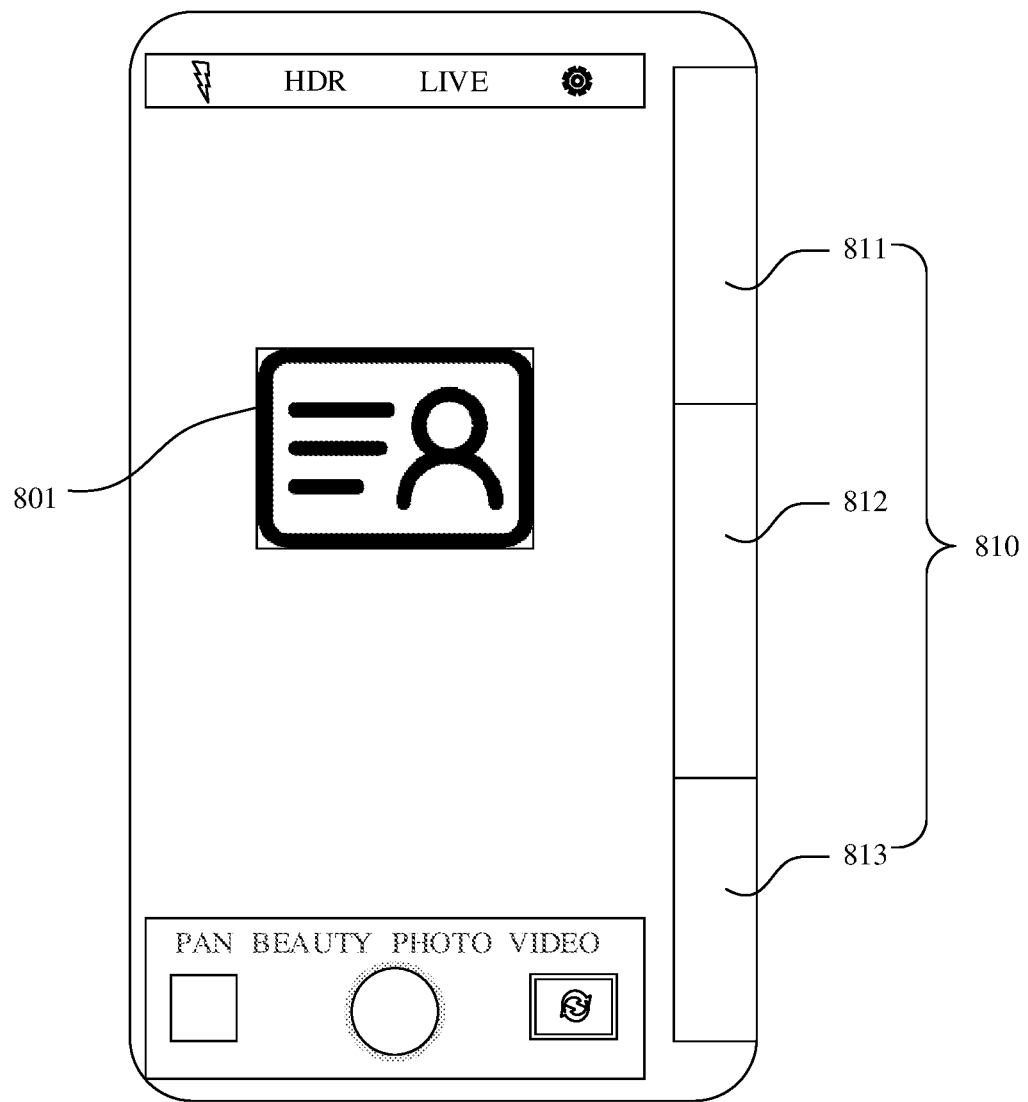
FIG. 8 is a seventh shooting preview screen according to an embodiment of this application.

In this embodiment, the objects that need to be masked, namely, the objects to be masked are preset. For example, the fourth preview image is first captured by the camera and displayed on the shooting preview screen, as shown in FIG. 8. The user can perform the third input on any object in the fourth preview image, and the third object 801 selected by the third input can be marked as a masked object in response to the third input. Therefore, in a case that a preview image captured subsequently includes a second object matching the third object, the display mode of the second object can be updated to the third display mode, masking the second object. After the third preview image is displayed, there is no need for user input selection to update the display mode of the second object matching the object to be masked, thus achieving masking. This allows for convenient operation and improves the efficiency of display updates. In an example, the third input can be a drag input.

As shown in FIG. 8, in an embodiment, after the capturing a fourth preview image through a camera and displaying the fourth preview image on the shooting preview screen, the method may further include: superimposing a second object display control region 810 on the fourth preview image in the shooting preview screen. The second object display control region 810 is divided into a fourth display control sub-region 811, a fifth display control sub-region 812, and a sixth display control sub-region 813. It should be noted that in this embodiment, the fourth display control sub-region 811 is used to display an unmasked object in the second object, and the fifth display control sub-region 812 is used to display a sign of an object of the first masked mode (for example, temporary masking) in objects in the fourth preview image.

Figure 9:
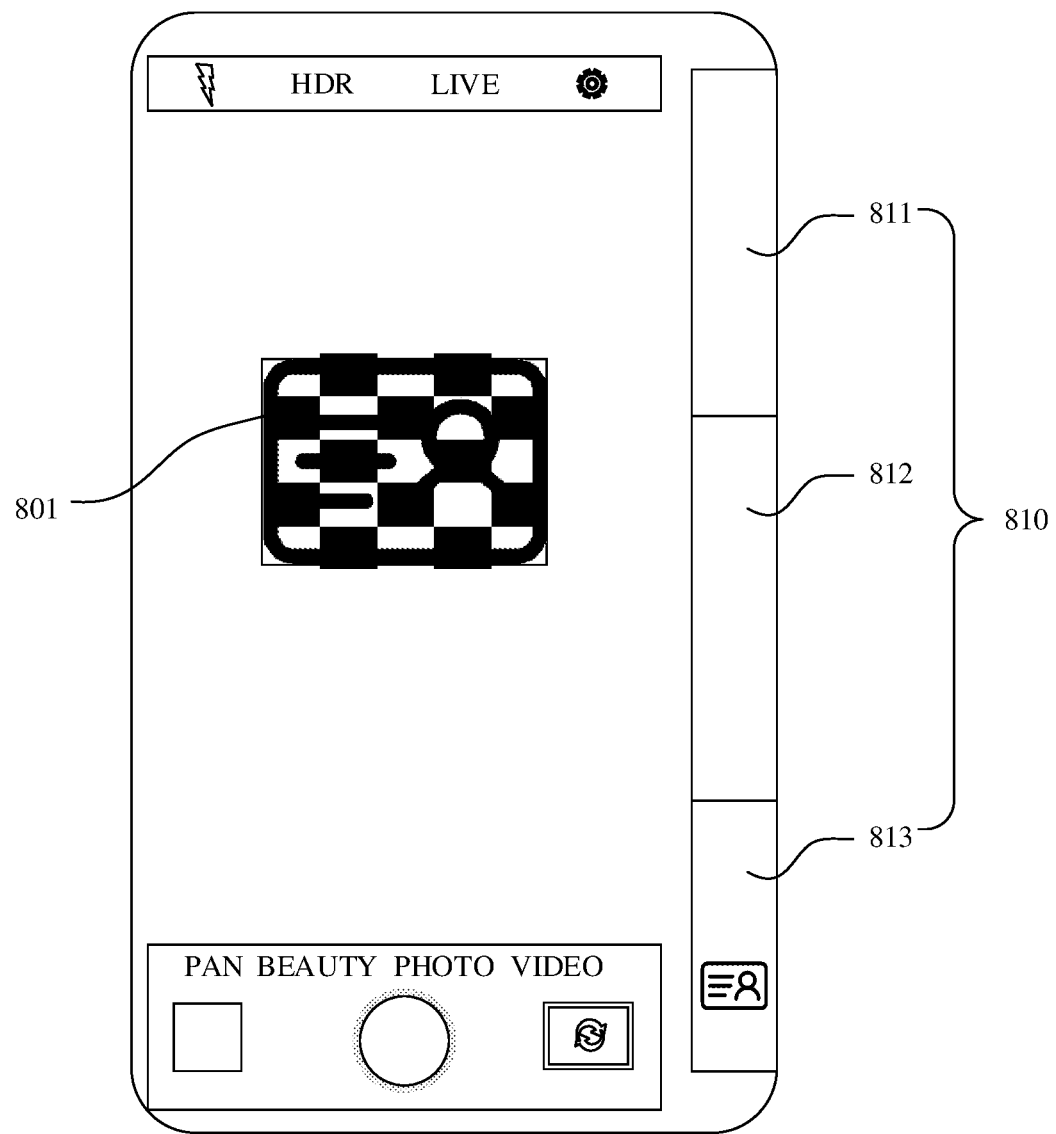
FIG. 9 is an eighth shooting preview screen according to an embodiment of this application.

The sixth display control region 813 is used to display a sign of an object of the second masked mode in the objects in the fourth preview image. For example, after the third object is marked as an object to be masked, the display mode of the third object can be updated to the second masked mode, and a sign of the third object is displayed in the sixth display control region 813, as shown in FIG. 9. In an example, the third input may be a drag input for the third object, and an end position of the third input is in the sixth display control sub-region. That is, before the third input performed by a user on the third object in the fourth preview image is received, the sign of the third object can be displayed in the fourth display control sub-region, and the sign of the third object can be switched from the fourth display control sub-region to the sixth display control sub-region for display in response to the third input.

In an embodiment, the first input includes a first sub-input and a second sub-input; and the receiving a first input performed by a user on a first object sign in an object display control region on a shooting preview screen includes: receiving a first sub-input performed by a user on the first object in the first preview image; displaying the first object sign in a first display control sub-region of the object display control region in response to the first sub-input, where the first object sign is used to indicate the first object; and receiving a second sub-input performed by a user to move the first object sign to a second display control sub-region of the object display control region.

In this embodiment, the first sub-input may be a tap input, for example, a long press input, to be specific, the user performs a long press input on the first object in the first preview image. In response to the long press input, the first object sign is displayed in the first display control sub-region of the object display control region, and then the user can perform the second sub-input on the first object sign in the first display control sub-region. In response to the second sub-input, the display mode of the first object can be updated. This is convenient for operation and can improve the efficiency of display adjustments. The second sub-input is a drag input, and an end position of the second sub-input may be in the second display control sub-region. In other words, the first object sign can be moved to the second display control sub-region of the object display control region through the second sub-input.

In an embodiment, the second display mode is the first masked mode, and the updating the display mode of the first object in the first preview image displayed on the shooting preview screen to the second display mode includes:

using a preset update method to update the display mode of the first object in the first preview image displayed on the shooting preview screen to the second display mode;

where the preset update method includes at least one of the following:

adjusting transparency of an image region of the first object;

covering the image region of the first object with a preset image; or blurring the image region of the first object.

The transparency of the first object is adjusted, for example, the transparency is reduced to make the first object more opaque, so that other regions of the first preview image are relatively more prominent than an image region of the first object. Covering the avatar region of the first object with a preset image makes the first object in the first preview image invisible. Covering the first object with the preset image can be understood as mosaic processing. For example, as shown in FIG. 9, mosaic processing is performed on the second object, which can improve information security. Blurring the image region of the first object can lower the visibility of the first object in the first preview image. Blurring the first object can be understood as blur processing.

In this embodiment, at least one of the four update methods can be used to mask the first object in the first preview image. By employing different updating methods for masking, different masking effects can be achieved, thereby enhancing the flexibility of display control.

In an embodiment, the preset update method is to use a preset image to cover the image region of the first object; and after the updating the display mode of the first object in the first preview image displayed on the shooting preview screen to the second display mode, the method includes:

receiving a fourth input performed by a user to drag the preset image to a preset region; and updating the display mode of the first object in the first preview image to the first display mode in response to the fourth input.

Figure 10:
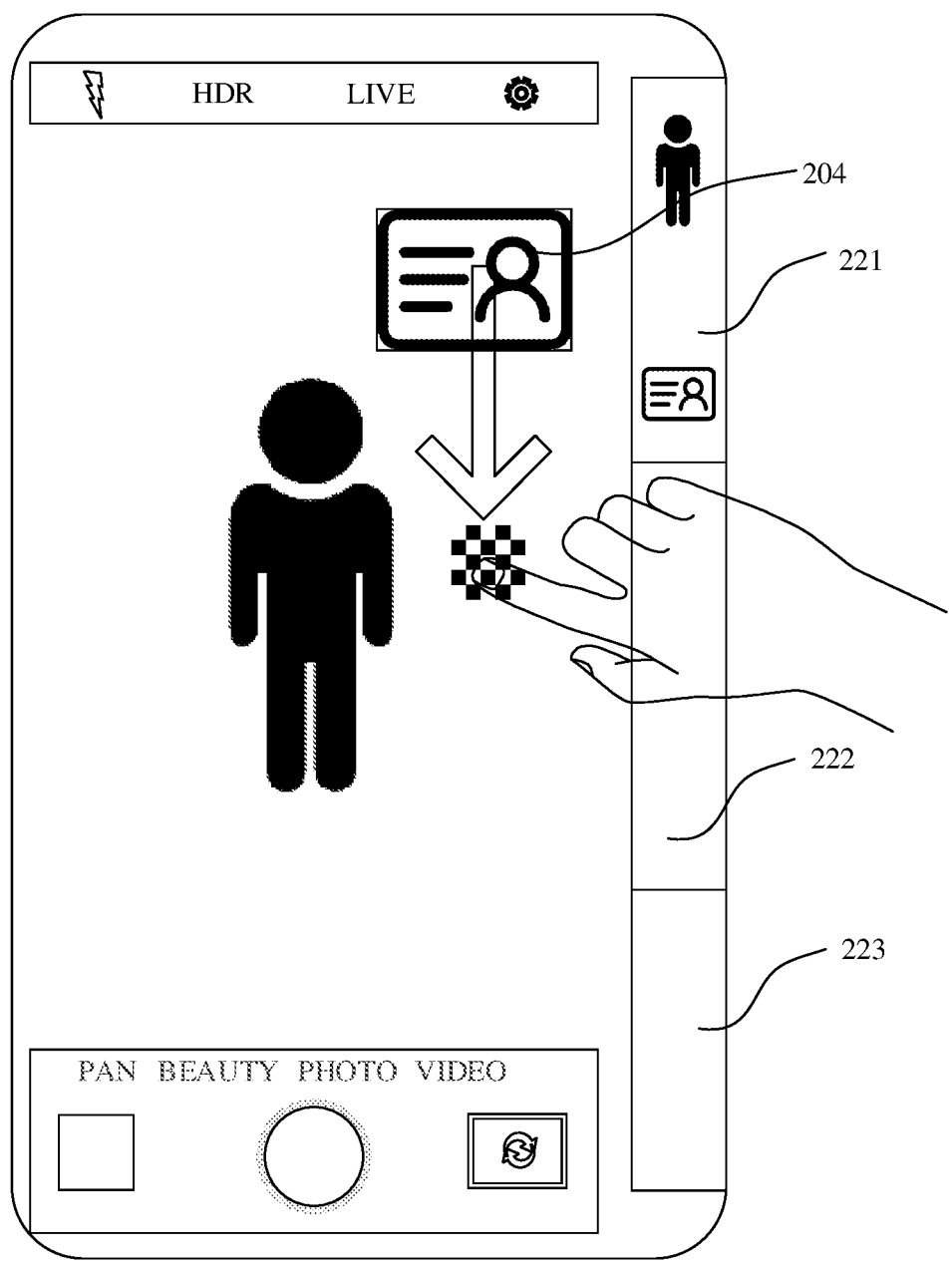
FIG. 10 is a ninth shooting preview screen according to an embodiment of this application.

For example, the first preview image includes a person and an identity card, and the identity card in the first preview image is subjected to mosaic processing, that is, the identity card is covered with the preset image to achieve masking. After the identity card is masked, the fourth input performed by a user on the preset image can further be received, and the masking of the identity card can be canceled in response to the fourth input, as shown in FIG. 10. In an example, the shortest distance between the boundary of the preset region and the boundary of the image region of the first object in the first preview image may be greater than a preset distance. For example, as shown in FIG. 10, the user can hold down the preset image on the identity card with one finger, drag the preset image to the preset region, and then release the finger to remove the masking on the identity card.

In an embodiment, after the updating a display mode of a first object in a first preview image displayed on the shooting preview screen, the method further includes: receiving a fifth input performed by a user on the shooting preview screen; and in response to the fifth input, controlling the camera to shoot and obtain the target image.

In the shooting of this embodiment, the target image of the first object of the updated display mode can be obtained. For example, in this embodiment, the first object is hidden, and the obtained target image does not include the first object, thus obtaining the desired target image without the first object by the user. This is no need to acquire and then process the image using software to obtain the desired target image without the first object by a user, making the operation convenient.

Figure 11:
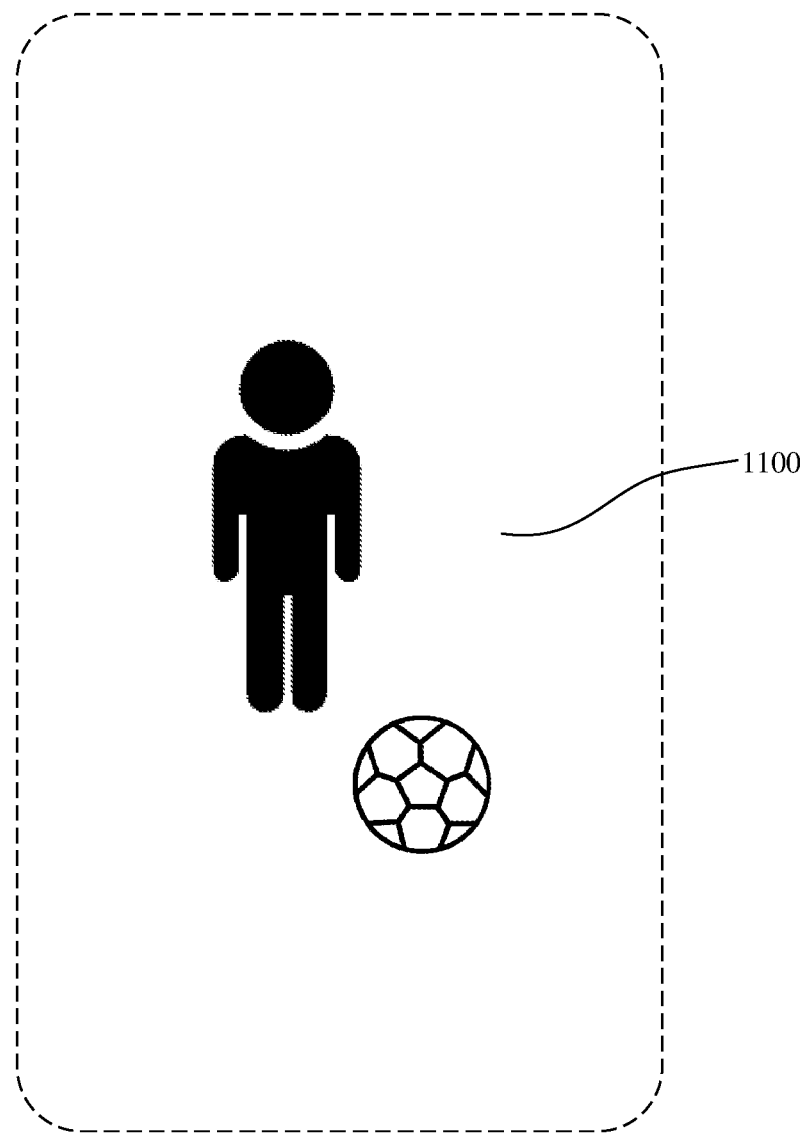
FIG. 11 is a target image captured according to an embodiment of this application.

For example, as shown in FIG. 6, the first preview image with the trash bin masked is displayed. A shooting control 610 is also superimposed on the first preview image in the shooting preview screen. After the fifth input is performed on the shooting control 610, and in response to the fifth input, shooting is performed to obtain the target image 1100 as shown in FIG. 11.

Figure 12:
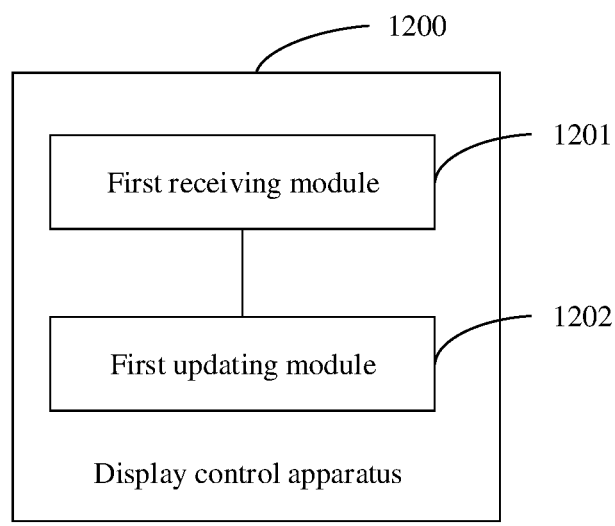
FIG. 12 is a schematic modular diagram of a display control apparatus according to an embodiment of this application.

As shown in FIG. 12, this application further provides a display control apparatus 1200 in an embodiment. The apparatus 1200 includes:

- a first receiving module 1201 configured to receive a first input performed by a user on a first object sign in an object display control region on a shooting preview screen; and
- a first updating module 1202 configured to update a display mode of a first object in a first preview image displayed on the shooting preview screen, in response to the first input;
- where the object display control region includes at least one object sign, each object sign is used to indicate a shooting object in the first preview image, and a shooting object indicated by the first object sign is the first object.

In an embodiment, the object display control region includes a first display control sub-region and a second display control sub-region, the first display control sub-region includes at least one object sign of a first display mode, and the second display control sub-region includes at least one object sign of a second display mode; where the first display mode and the second display mode each are one of a displayed mode and a first masked mode;

- the updating a display mode of a first object in a first preview image displayed on the shooting preview screen includes:
- updating the display mode of the first object in the first preview image displayed on the shooting preview screen to the second display mode; and
- the apparatus 1200 further includes:
- a first display module, configured to: after the first receiving module receives the first input performed by a user on the first object sign in the object display control region on the shooting preview screen, cancel the display of the first object sign in the first display control sub-region and display the first object sign in the second display control sub-region, in response to the first input.

In an embodiment, the apparatus 1200 further includes:

- a second receiving module configured to: receive a second input performed by a user on the first object sign in the second display control sub-region after the first display module cancels the display of the first object sign in the first display control sub-region and displays the first object sign in the second display control sub-region, in response to the first input; and
- a second updating module configured to, in response to the second input, update the display mode of the first object in the first preview image on the shooting preview screen to the first display mode, cancel the display of the first object sign in the second display control sub-region and display the first object sign in the first display control sub-region.

In an embodiment, the apparatus 1200 further includes:

- a third updating module configured to: after the first updating module updates the display mode of the first object in the first preview image displayed on the shooting preview screen, in response to the first input, update the first preview image displayed on the shooting preview screen to a second preview image, and in a case that the second preview image includes the first object, update the display mode of the first object in the second preview image to a target display mode,
- where the target display mode is a display mode of the first object in the first preview image at a target moment before the first preview image is updated to the second preview image, and the target moment is a moment with a shortest time interval from an update moment of the second preview image.

In an embodiment, the object display control region includes a third display control sub-region, the third display control sub-region includes at least one object sign of a third display mode, and the third display mode is a second masked mode; and the apparatus 1200 further includes:

- a detection module configured to detect an object in a preview image displayed on the shooting preview screen; and
- a fourth updating module configured to: in a case that a third preview image displayed on the shooting preview screen includes a second object matching an object to be masked, update a display mode of the second object in the third preview image to a third display mode and display an object sign of the second object in the third display control sub-region.

In an embodiment, the apparatus 1200 further includes:

- a second display module configured to: before the fourth updating module updates the display mode of the second object in the third preview image to the third display mode and displays the object sign of the second object in the third display control sub-region, capture a fourth preview image through a camera and display the fourth preview image on the shooting preview screen;
- a third receiving module configured to receive a third input performed by a user on a third object in the fourth preview image; and
- a marking module configured to mark the third object as an object to be masked in response to the third input.

In an embodiment, the first input includes a first sub-input and a first drag input; and the first receiving module includes:

- a first receiving sub-module configured to receive a first sub-input performed by a user on the first object in the first preview image;
- a third display module configured to display the first object sign in a first display control sub-region of the object display control region in response to the first sub-input, where the first object sign is used to indicate the first object; and
- a second receiving sub-module configured to receive a second sub-input performed by a user to move the first object sign to a second display control sub-region of the object display control region.

In an embodiment, the second display mode is the first masked mode, and the updating the display mode of the first object in the first preview image displayed on the shooting preview screen to the second display mode includes:

- using a preset update method to update the display mode of the first object in the first preview image displayed on the shooting preview screen to the second display mode;
- where the preset update method includes at least one of the following:
- adjusting transparency of an image region of the first object;
- covering the image region of the first object with a preset image; or
- blurring the image region of the first object.

In an embodiment, the preset update method is to use a preset image to cover the image region of the first object; and the apparatus 1200 further includes:
a fourth receiving module configured to: after the first updating module updates the display mode of the first object in the first preview image displayed on the shooting preview screen to the second display mode, receive a fourth input performed by a user to drag the preset image to a preset region; and
a fifth updating module configured to update the display mode of the first object in the first preview image to the first display mode in response to the fourth input.

The display control apparatus in this embodiment of this application may be a terminal or may be a component, an integrated circuit, or a chip in a terminal. The apparatus may be a mobile electronic device or a non-mobile electronic device. The mobile electronic device may be a mobile phone, a tablet computer, a notebook computer, a palmtop computer, a vehicle-mounted electronic device, a wearable device, an ultra-mobile personal computer (UMPC), a netbook, or a personal digital assistant (PDA), and the non-mobile electronic device may be a server, a network attached storage (NAS), a personal computer (PC), a television (TV), a teller machine, a self-service machine, or the like. This is not specifically limited in the embodiments of this application.

The display control apparatus in this embodiment of this application may be an apparatus with an operating system, and the operating system may be an android operating system, an iOS operating system, or other possible operating systems. This is not specifically limited in the embodiments of this application.

The display control apparatus provided in this embodiment of this application can implement the processes of the foregoing display control method embodiments. To avoid repetition, details are not described herein again.

Figure 13:
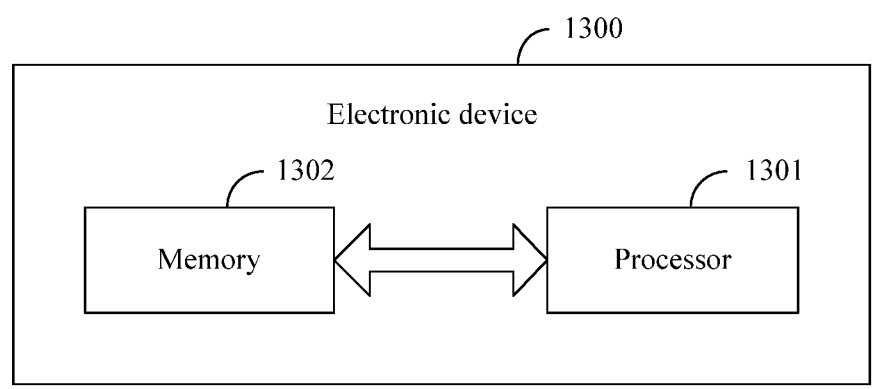
FIG. 13 is a schematic diagram of an electronic device according to an embodiment of this application.

Optionally, as shown in FIG. 13, an embodiment of this application further provides an electronic device 1300, including a processor 1301, a memory 1302, and a program or instructions stored in the memory 1302 and executable on the processor 1301. When the program or instructions are executed by the processor 1301, each process of the foregoing display control method embodiments is implemented, with the same technical effects achieved. To avoid repetition, details are not described herein again.

It should be noted that the electronic device in this embodiment of this application includes the foregoing mobile electronic device and non-mobile electronic device.

Figure 14:
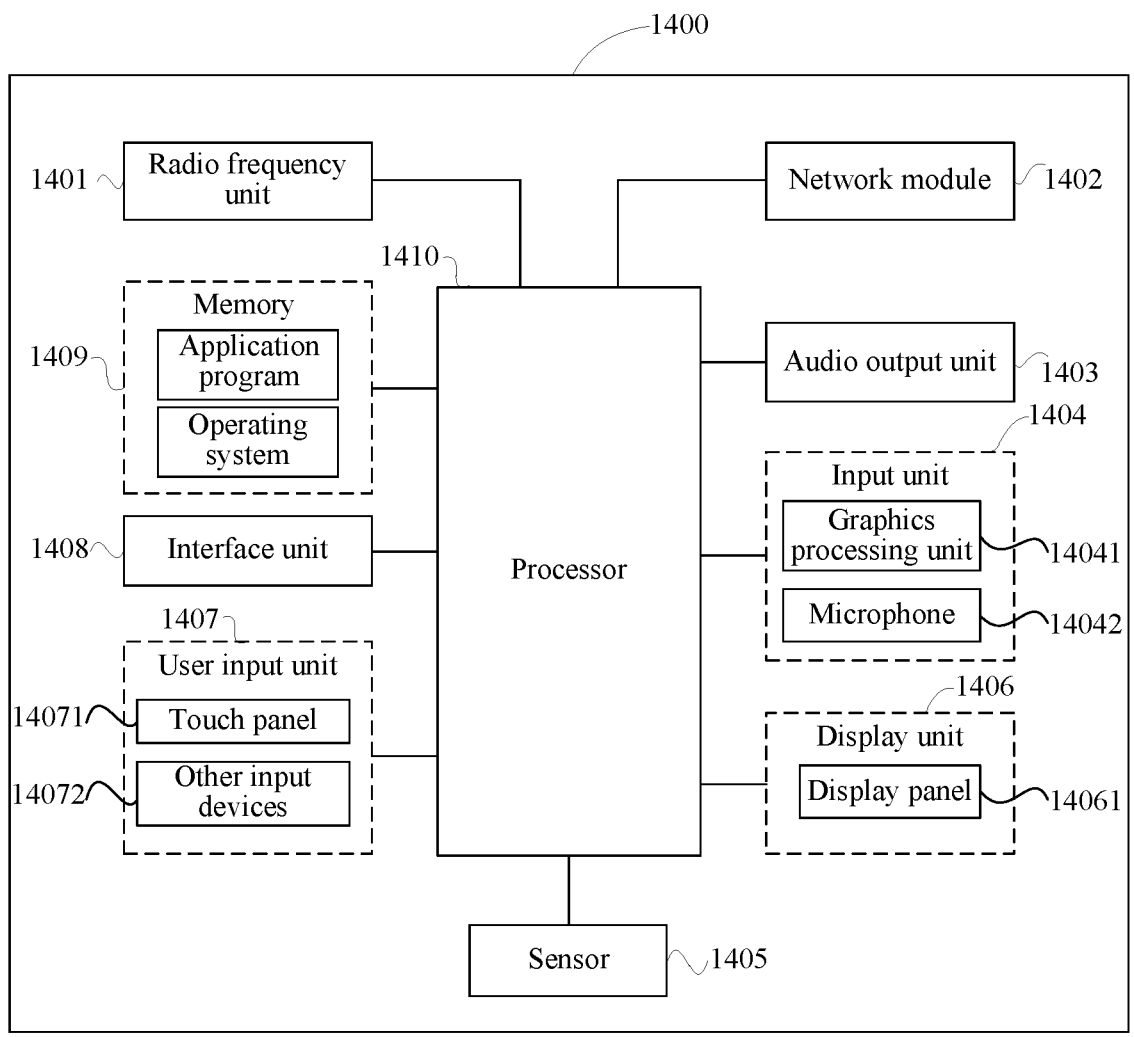
FIG. 14 is a schematic diagram of a hardware structure of an electronic device according to an embodiment of this application.

FIG. 14 is a schematic diagram of a hardware structure of an electronic device according to an embodiment of this application.

The electronic device 1400 includes but is not limited to components such as a radio frequency unit 1401, a network module 1402, an audio output unit 1403, an input unit 1404, a sensor 1405, a display unit 1406, a user input unit 1407, an interface unit 1408, a memory 1409, and a processor 1410.

It can be understood by persons skilled in the art that the electronic device 1400 may further include a power supply (for example, a battery) supplying power to the components. The power supply may be logically connected to the processor 1410 via a power management system, so that functions such as charge management, discharge management, and power consumption management are implemented by using the power management system. The structure of the electronic device shown in FIG. 14 does not constitute any limitation on the electronic device, and the electronic device may include more or fewer components than shown in the figure, or combine some of the components, or have different arrangements of the components. Details are not described herein.

The user input unit 1407 is configured to receive a first input performed by a user on a first object sign in an object display control region on a shooting preview screen; and
the processor 1410 is configured to update a display mode of a first object in a first preview image displayed on the shooting preview screen, in response to the first input;
where the object display control region includes at least one object sign, each object sign is used to indicate a shooting object in the first preview image, and a shooting object indicated by the first object sign is the first object.

In an embodiment, the object display control region includes a first display control sub-region and a second display control sub-region, the first display control sub-region includes at least one object sign of a first display mode, and the second display control sub-region includes at least one object sign of a second display mode; where the first display mode and the second display mode each are one of a displayed mode and a first masked mode;
the updating a display mode of a first object in a first preview image displayed on the shooting preview screen includes: updating the display mode of the first object in the first preview image displayed on the shooting preview screen to the second display mode; and
the display unit 1406 is configured to: after the user input unit 1407 receives the first input performed by a user on the first object sign in the object display control region on the shooting preview screen, cancel the display of the first object sign in the first display control sub-region and display the first object sign in the second display control sub-region, in response to the first input.

In an embodiment, the user input unit 1407 is configured to: receive a second input performed by a user on the first object sign in the second display control sub-region after the display unit 1406 cancels the display of the first object sign in the first display control sub-region and displays the first object sign in the second display control sub-region, in response to the first input; and
the processor 1410 is configured to, in response to the second input, update the display mode of the first object in the first preview image on the shooting preview screen to the first display mode, cancel the display of the first object sign in the second display control sub-region and display the first object sign in the first display control sub-region.

In an embodiment, the processor 1410 is configured to: after the processor 1410 updates the display mode of the first object in the first preview image displayed on the shooting preview screen, in response to the first input, update the first preview image displayed on the shooting preview screen to a second preview image, and in a case that the second preview image includes the first object, update the display mode of the first object in the second preview image to a target display mode;
where the target display mode is a display mode of the first object in the first preview image at a target moment before the first preview image is updated to the second preview image, and the target moment is a moment with a shortest time interval from an update moment of the second preview image.

In an embodiment, the object display control region includes a third display control sub-region, the third display control sub-region includes at least one object sign of a third display mode, and the third display mode is a second masked mode; and
- the processor 1410 is configured to detect an object in a preview image displayed on the shooting preview screen; and
- is configured to, in a case that a third preview image displayed on the shooting preview screen includes a second object matching an object to be masked, update a display mode of the second object in the third preview image to a third display mode, and the display unit 1406 is configured to display an object sign of the second object in the third display control sub-region.

In an embodiment, the display unit 1406 is configured to: before the display mode of the second object in the third preview image is updated to the third display mode and the object sign of the second object is displayed in the third display control sub-region, capture a fourth preview image through a camera and display the fourth preview image on the shooting preview screen; and
- the user input unit 1407 is configured to receive a third input performed by a user on a third object in the fourth preview image; and
- the processor 1410 is configured to mark the third object as an object to be masked in response to the third input.

In an embodiment, the first input includes a first sub-input and a second sub-input;
- the user input unit 1407 is configured to receive a first sub-input performed by a user on the first object in the first preview image;
- the display unit 1406 is configured to display the first object sign in a first display control sub-region of the object display control region in response to the first sub-input, where
- the first object sign is used to indicate the first object; and the user input unit 1407 is configured to receive a second sub-input performed by a user to move the first object sign to a second display control sub-region of the object display control region.

In an embodiment, the second display mode is the first masked mode, and the updating the display mode of the first object in the first preview image displayed on the shooting preview screen to the second display mode includes:
using a preset update method to update the display mode of the first object in the first preview image displayed on the shooting preview screen to the second display mode;
where the preset update method includes at least one of the following:
adjusting transparency of an image region of the first object;
covering the image region of the first object with a preset image; or
blurring the image region of the first object.

In an embodiment, the preset update method is to use a preset image to cover the image region of the first object;
- the user input unit 1407 is configured to: after the processor 1410 updates the display mode of the first object in the first preview image displayed on the shooting preview screen to the second display mode, receive a fourth input performed by a user to drag the preset image to a preset region; and
- the processor 1410 is configured to update the display mode of the first object in the first preview image to the first display mode in response to the fourth input.

In an embodiment, the user input unit 1407 is configured to receive a fifth input performed by a user on the shooting preview screen after the processor 1410 updates the display mode of the first object in the first preview image displayed on the shooting preview screen; and
- the processor 1410 is configured to in response to the fifth input, control the camera to shoot and obtain the target image.

It can be understood that in this embodiment of this application, the input unit 1404 may include a graphics processing unit (GPU) 14041 and a microphone 14042. The graphics processing unit 14041 processes image data of a still picture or video obtained by an image capture apparatus (for example, a camera) in a video capture mode or an image capture mode. The display unit 1406 may include a display panel 14061, and the display panel 14061 may be configured in a form of a liquid crystal display, an organic light emitting diode, or the like. The user input unit 1407 includes a touch panel 14071 and other input devices 14072. The touch panel 14071 is also referred to as a touchscreen. The touch panel 14071 may include two parts: a touch detection apparatus and a touch controller. The other input devices 14072 may include but are not limited to a physical keyboard, a function key (such as a volume control key or a power on/off key), a trackball, a mouse, a joystick, and the like. Details are not described herein. The memory 1409 may be configured to store software programs and various data, including but not limited to application programs and an operating system. An application processor and a modem processor may be integrated in the processor 1410. The application processor primarily processes an operating system, user interfaces, application programs, and the like. The modem processor primarily processes radio communication. It can be understood that the modem processor may alternatively be not integrated in the processor 1410.

An embodiment of this application further provides a non-transitory readable storage medium. The non-transitory readable storage medium stores a program or instructions. When the program or instructions are executed by a processor, each process of the foregoing display control method embodiments is implemented, with the same technical effects achieved. To avoid repetition, details are not described again.

The processor may be a processor in the electronic device described in the foregoing embodiment. The non-transitory readable storage medium includes a non-transitory computer-readable storage medium, such as a computer read-only memory (ROM), a random access memory (RAM), a magnetic disk, or an optical disc.

An embodiment of this application further provides a chip. The chip includes a processor and a communications interface. The communications interface is coupled to the processor. The processor is configured to run a program or instructions to implement each process of the foregoing display control method embodiments, with the same technical effects achieved. To avoid repetition, details are not described herein again.

It should be understood that the chip in the embodiments of this application may also be referred to as a system-level chip, a system chip, a chip system, a system on chip, or the like.

An embodiment of this application further provides a computer program product, where the computer program product is stored in a non-transient storage medium, and when the computer program product is executed by at least one processor so as to implement steps of the foregoing display control method embodiments, with the same technical effects achieved. To avoid repetition, details are not described herein again.

It should be noted that the terms "include", "comprise", or any of their variants are intended to cover a non-exclusive inclusion, such that a process, method, article, or apparatus that includes a series of elements includes not only those elements but also other elements that are not expressly listed, or further includes elements inherent to such process, method, article, or apparatus. Without more constraints, an element preceded by "includes a . . . " does not preclude the presence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described method may be performed in an order different from the order described, and steps may be added, omitted, or combined. In addition, features described with reference to some examples may be combined in other examples.

From the description of the foregoing implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such an understanding, the technical solutions of this application essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

Persons of ordinary skill in the art may realize that units and algorithm steps of various examples described with reference to the embodiments disclosed in this specification can be implemented by using electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this application.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When implemented in a form of a software functional unit and sold or used as an independent product, the functions may be stored in a non-transitory computer-readable storage medium. Based on such an understanding, the technical solutions of this application essentially, or the part contributing to the related art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a ROM, a RAM, a magnetic disk, or an optical disc.

Persons of ordinary skill in the art may understand that all or some of the processes of the methods in the embodiments may be implemented by a computer program controlling relevant hardware. The program may be stored in a non-transitory computer readable storage medium. When the program runs, the processes of the method embodiments may be included. The storage medium may be a magnetic disk, an optical disc, a ROM, a RAM, or the like.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. A display control method comprising:
receiving a first input performed by a user on a first object sign in an object display control region on a shooting preview screen; and
updating a display mode of a first object in a first preview image displayed on the shooting preview screen, in response to the first input;
wherein the object display control region includes at least one object sign, each object sign is used to indicate a shooting object in the first preview image, and a shooting object indicated by the first object sign is the first object;
wherein the object display control region includes a first display control sub-region and a second display control sub-region, the first display control sub-region includes at least one object sign of a first display mode, and the second display control sub-region includes at least one object sign of a second display mode; wherein the first display mode and the second display mode each are one of a displayed mode and a first masked mode;

the updating a display mode of a first object in a first preview image displayed on the shooting preview screen comprises:

updating the display mode of the first object in the first preview image displayed on the shooting preview screen to the second display mode; and after the receiving a first input performed by a user on a first object sign in an object display control region on a shooting preview screen, the method further comprises:

canceling the display of the first object sign in the first display control sub-region and displaying the first object sign in the second display control sub-region, in response to the first input.

2. The method according to claim 1, wherein after the canceling the display of the first object sign in the first display control sub-region and displaying the first object sign in the second display control sub-region, in response to the first input, the method further comprises:

receiving a second input performed by a user on the first object sign in the second display control sub-region; and in response to the second input, updating the display mode of the first object in the first preview image on the shooting preview screen to the first display mode, canceling the display of the first object sign in the second display control sub-region and displaying the first object sign in the first display control sub-region.

3. The method according to claim 1, wherein after the updating a display mode of a first object in a first preview image displayed on the shooting preview screen, in response to the first input, the method further comprises:

updating the first preview image displayed on the shooting preview screen to a second preview image, and in a case that the second preview image includes the first object, updating the display mode of the first object in the second preview image to a target display mode;

wherein the target display mode is a display mode of the first object in the first preview image at a target moment before the first preview image is updated to the second preview image, and the target moment is a moment with a shortest time interval from an update moment of the second preview image.

4. The method according to claim 1, wherein the object display control region includes a third display control sub-region, the third display control sub-region includes at least one object sign of a third display mode, and the third display mode is a second masked mode; and the method further comprises:

detecting an object in a preview image displayed on the shooting preview screen; and in a case that a third preview image displayed on the shooting preview screen includes a second object matching an object to be masked, updating a display mode of the second object in the third preview image to a third display mode and displaying an object sign of the second object in the third display control sub-region.

5. The method according to claim 4, wherein before the updating a display mode of the second object in the third preview image to a third display mode and displaying an object sign of the second object in the third display control sub-region, the method further comprises:

capturing a fourth preview image through a camera and displaying the fourth preview image on the shooting preview screen;

receiving a third input performed by a user on a third object in the fourth preview image; and marking the third object as an object to be masked in response to the third input.

6. The method according to claim 1, wherein the first input comprises a first sub-input and a second sub-input; and the receiving a first input performed by a user on a first object sign in an object display control region on a shooting preview screen comprises:

receiving a first sub-input performed by a user on the first object in the first preview image;

displaying the first object sign in a first display control sub-region of the object display control region in response to the first sub-input, wherein the first object sign is used to indicate the first object; and receiving a second sub-input performed by a user to move the first object sign to a second display control sub-region of the object display control region.

7. The method according to claim 1, wherein the second display mode is the first masked mode, and the updating the display mode of the first object in the first preview image displayed on the shooting preview screen to the second display mode comprises:

using a preset update method to update the display mode of the first object in the first preview image displayed on the shooting preview screen to the second display mode;

wherein the preset update method includes at least one of:

adjusting transparency of an image region of the first object;

covering the image region of the first object with a preset image; or blurring the image region of the first object.

8. The method according to claim 7, wherein the preset update method is to use a preset image to cover the image region of the first object, and after the updating the display mode of the first object in the first preview image displayed on the shooting preview screen to the second display mode, the method comprises:

receiving a fourth input performed by a user to drag the preset image to a preset region; and updating the display mode of the first object in the first preview image to the first display mode in response to the fourth input.

9. An electronic device, comprising a processor and a memory storing a program or an instruction that is capable of running on the processor, wherein the program or the instruction, when executed by the processor, causes the electronic device to perform:

receiving a first input performed by a user on a first object sign in an object display control region on a shooting preview screen; and updating a display mode of a first object in a first preview image displayed on the shooting preview screen, in response to the first input;

wherein the object display control region includes at least one object sign, each object sign is used to indicate a shooting object in the first preview image, and a shooting object indicated by the first object sign is the first object;

wherein the object display control region includes a first display control sub-region and a second display control sub-region, the first display control sub-region includes at least one object sign of a first display mode, and the second display control sub-region includes at least one object sign of a second display mode; wherein the first display mode and the second display mode each are one of a displayed mode and a first masked mode;

when updating a display mode of a first object in a first preview image displayed on the shooting preview screen, the program or the instruction is executed by the processor to cause the electronic device to further perform:

updating the display mode of the first object in the first preview image displayed on the shooting preview screen to the second display mode; and after the receiving a first input performed by a user on a first object sign in an object display control region on a shooting preview screen, the program or the instruction, when executed by the processor, causes the electronic device to further perform:

canceling the display of the first object sign in the first display control sub-region and displaying the first object sign in the second display control sub-region, in response to the first input.

10. The electronic device according to claim 9, wherein after the canceling the display of the first object sign in the first display control sub-region and displaying the first object sign in the second display control sub-region, in response to the first input, the program or the instruction, when executed by the processor, causes the electronic device to further perform:

receiving a second input performed by a user on the first object sign in the second display control sub-region; and in response to the second input, updating the display mode of the first object in the first preview image on the shooting preview screen to the first display mode, canceling the display of the first object sign in the second display control sub-region and displaying the first object sign in the first display control sub-region.

11. The electronic device according to claim 9, wherein after the updating a display mode of a first object in a first preview image displayed on the shooting preview screen, in response to the first input, the program or the instruction, when executed by the processor, causes the electronic device to further perform:

updating the first preview image displayed on the shooting preview screen to a second preview image, and in a case that the second preview image includes the first object, updating the display mode of the first object in the second preview image to a target display mode;

wherein the target display mode is a display mode of the first object in the first preview image at a target moment before the first preview image is updated to the second preview image, and the target moment is a moment with a shortest time interval from an update moment of the second preview image.

12. The electronic device according to claim 9, wherein the object display control region includes a third display control sub-region, the third display control sub-region includes at least one object sign of a third display mode, and the third display mode is a second masked mode; wherein the program or the instruction, when executed by the processor, causes the electronic device to further perform:

detecting an object in a preview image displayed on the shooting preview screen; and in a case that a third preview image displayed on the shooting preview screen includes a second object matching an object to be masked, updating a display mode of the second object in the third preview image to a third display mode and displaying an object sign of the second object in the third display control sub-region.

13. The electronic device according to claim 12, wherein before the updating a display mode of the second object in the third preview image to a third display mode and displaying an object sign of the second object in the third display control sub-region, the program or the instruction, when executed by the processor, causes the electronic device to further perform:

capturing a fourth preview image through a camera and displaying the fourth preview image on the shooting preview screen;

receiving a third input performed by a user on a third object in the fourth preview image; and marking the third object as an object to be masked in response to the third input.

14. The electronic device according to claim 9, wherein the first input comprises a first sub-input and a second sub-input; and when receiving a first input performed by a user on a first object sign in an object display control region on a shooting preview screen, the program or the instruction is executed by the processor to cause the electronic device to perform:

receiving a first sub-input performed by a user on the first object in the first preview image;

displaying the first object sign in a first display control sub-region of the object display control region in response to the first sub-input, wherein the first object sign is used to indicate the first object; and receiving a second sub-input performed by a user to move the first object sign to a second display control sub-region of the object display control region.

15. The electronic device according to claim 9, wherein when the second display mode is the first masked mode, and the updating the display mode of the first object in the first preview image displayed on the shooting preview screen to the second display mode, the program or the instruction is executed by the processor to cause the electronic device to perform:

using a preset update method to update the display mode of the first object in the first preview image displayed on the shooting preview screen to the second display mode;

wherein the preset update method includes at least one of:

adjusting transparency of an image region of the first object;

covering the image region of the first object with a preset image; or blurring the image region of the first object.

16. The electronic device according to claim 15, wherein the preset update method is to use a preset image to cover the image region of the first object, and after the updating the display mode of the first object in the first preview image displayed on the shooting preview screen to the second display mode, the program or the instruction, when executed by the processor, causes the electronic device to further perform:

receiving a fourth input performed by a user to drag the preset image to a preset region; and updating the display mode of the first object in the first preview image to the first display mode in response to the fourth input.

17. A non-transitory readable storage medium, storing a program or an instruction, wherein the program or the instruction, when executed by a processor, causes the processor to perform:
receiving a first input performed by a user on a first object sign in an object display control region on a shooting preview screen; and
updating a display mode of a first object in a first preview image displayed on the shooting preview screen, in response to the first input;
wherein the object display control region includes at least one object sign, each object sign is used to indicate a shooting object in the first preview image, and a shooting object indicated by the first object sign is the first object;
wherein the object display control region includes a first display control sub-region and a second display control sub-region, the first display control sub-region includes at least one object sign of a first display mode, and the second display control sub-region includes at least one object sign of a second display mode; wherein the first display mode and the second display mode each are one of a displayed mode and a first masked mode;
when updating a display mode of a first object in a first preview image displayed on the shooting preview screen, the program or the instruction is executed by the processor to cause the processor to further perform:
updating the display mode of the first object in the first preview image displayed on the shooting preview screen to the second display mode; and
after the receiving a first input performed by a user on a first object sign in an object display control region on a shooting preview screen, the program or the instruction, when executed by the processor, causes the processor to further perform:
canceling the display of the first object sign in the first display control sub-region and displaying the first object sign in the second display control sub-region, in response to the first input.

18. The non-transitory readable storage medium according to claim 17, wherein after the canceling the display of the first object sign in the first display control sub-region and displaying the first object sign in the second display control sub-region, in response to the first input, the program or the instruction, when executed by the processor, causes the electronic device to further perform:

receiving a second input performed by a user on the first object sign in the second display control sub-region; and
in response to the second input, updating the display mode of the first object in the first preview image on the shooting preview screen to the first display mode, canceling the display of the first object sign in the second display control sub-region and displaying the first object sign in the first display control sub-region.

19. The non-transitory readable storage medium according to claim 17, wherein after the updating a display mode of a first object in a first preview image displayed on the shooting preview screen, in response to the first input, the program or the instruction, when executed by the processor, causes the electronic device to further perform:
updating the first preview image displayed on the shooting preview screen to a second preview image, and in a case that the second preview image includes the first object, updating the display mode of the first object in the second preview image to a target display mode;
wherein the target display mode is a display mode of the first object in the first preview image at a target moment before the first preview image is updated to the second preview image, and the target moment is a moment with a shortest time interval from an update moment of the second preview image.

20. The non-transitory readable storage medium according to claim 17, wherein the object display control region includes a third display control sub-region, the third display control sub-region includes at least one object sign of a third display mode, and the third display mode is a second masked mode; wherein
the program or the instruction, when executed by the processor, causes the electronic device to further perform:
detecting an object in a preview image displayed on the shooting preview screen; and
in a case that a third preview image displayed on the shooting preview screen includes a second object matching an object to be masked, updating a display mode of the second object in the third preview image to a third display mode and displaying an object sign of the second object in the third display control sub-region.

* * * * *